United States Patent
Straßer

(10) Patent No.: US 11,318,855 B2
(45) Date of Patent: May 3, 2022

(54) MOTOR VEHICLE HAVING AN ELECTRIC MACHINE AS A DRIVE MACHINE AND METHOD FOR OPERATING A DC-DC CONVERTER IN A MOTOR VEHICLE

(71) Applicant: AUDI AG, Ingolstadt (DE)

(72) Inventor: Roman Straßer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 96 days.

(21) Appl. No.: 16/906,148

(22) Filed: Jun. 19, 2020

(65) Prior Publication Data
US 2021/0078421 A1 Mar. 18, 2021

(30) Foreign Application Priority Data
Sep. 16, 2019 (DE) ...................... 10 2019 124 827.2

(51) Int. Cl.
*B60L 53/20* (2019.01)
*B60K 1/04* (2019.01)
*B60K 1/00* (2006.01)
*B60L 53/22* (2019.01)
(Continued)

(52) U.S. Cl.
CPC ............... *B60L 53/20* (2019.02); *B60K 1/00* (2013.01); *B60K 1/04* (2013.01); *B60L 53/22* (2019.02); *B60L 58/20* (2019.02); *H02M 3/1584* (2013.01); *B60L 2210/10* (2013.01); *H02J 2310/48* (2020.01); *Y02T 10/72* (2013.01)

(58) Field of Classification Search
CPC ...... Y02T 10/72; B60L 2210/10; B60L 58/20; H02J 2310/46; H02M 3/1584; B60K 1/00; B60K 2001/003
See application file for complete search history.

(56) References Cited

U.S. PATENT DOCUMENTS

| 6,154,381 A | 11/2000 | Kajouke et al. |
| 2018/0019667 A1 | 1/2018 | Salem et al. |
| 2021/0094441 A1* | 4/2021 | Sampson ................. B60K 1/02 |

FOREIGN PATENT DOCUMENTS

| DE | 102007024567 A1 * | 11/2008 | ............... H02J 7/34 |
| DE | 10 2013 114 188 A1 | 6/2014 | |
| DE | 10 2013 006 811 A1 | 10/2014 | |

(Continued)

OTHER PUBLICATIONS

Office Action dated Apr. 16, 2021 in corresponding German Application No. 10 2019 124 827.2; 20 pages with machine generated English-language translation.

(Continued)

*Primary Examiner* — Ryan Johnson
(74) *Attorney, Agent, or Firm* — Maier & Maier, PLLC

(57) ABSTRACT

A motor vehicle, including an electric machine as a drive machine, a high-voltage battery, a high-voltage network to which the electric machine and the high-voltage battery are connected, a low-voltage network having a lower voltage than the high-voltage network, and a DC-DC converter, which connects the low-voltage network and the high-voltage network and is designed for a maximum deliverable rated voltage. The DC-DC converter includes at least two independently usable converter circuits having different maximum power and a control unit. The control unit selects at least one converter circuit to be operated in dependence on a power requirement value of the low-voltage network.

9 Claims, 2 Drawing Sheets

(51) Int. Cl.
*B60L 58/20* (2019.01)
*H02M 3/158* (2006.01)

(56) References Cited

FOREIGN PATENT DOCUMENTS

| JP | 2012244862 A | * | 12/2012 | |
|---|---|---|---|---|
| KR | 20160086512 A | | 7/2016 | |
| KR | 20190016401 A | | 2/2019 | |
| WO | WO-2013015106 A1 | * | 1/2013 | .............. B60L 58/20 |

OTHER PUBLICATIONS

Examination Report dated Apr. 28, 2020 in corresponding German application No. 10 2019 124 827.2; 18 pages including Machine-generated English-language translation.

* cited by examiner

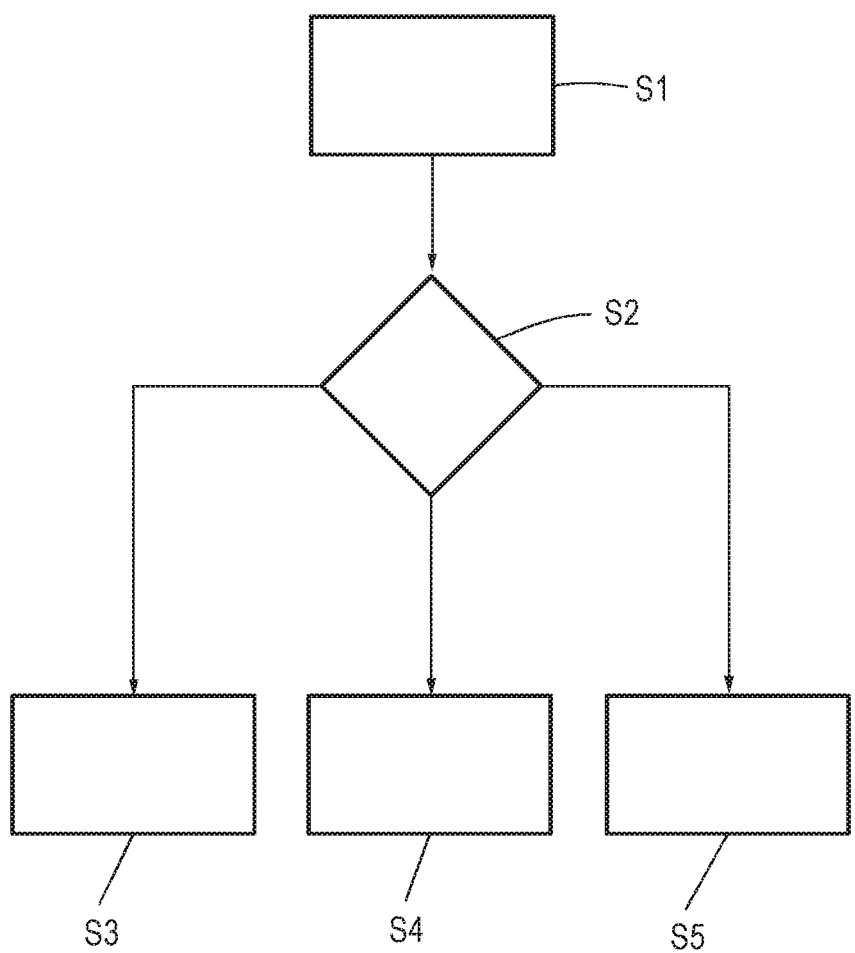

MOTOR VEHICLE HAVING AN ELECTRIC MACHINE AS A DRIVE MACHINE AND METHOD FOR OPERATING A DC-DC CONVERTER IN A MOTOR VEHICLE

FIELD

The disclosure relates to a motor vehicle, comprising an electric machine as a drive machine, a high-voltage battery, a high-voltage network to which the electric machine and the high-voltage battery are connected, a low-voltage network having a lower voltage than the high-voltage network, and a DC-DC converter, which connects the low-voltage network and the high-voltage network and is designed for a maximum deliverable rated voltage

BACKGROUND

In electrically operated motor vehicles (EV—electric vehicles), for example, battery-powered electrically operated motor vehicles (BEV), plug-in hybrids (PHEV), and so-called BZEV (Battery Zero Emission Vehicle), DC-DC converters are used to supply the low-voltage network in order to convert from the high voltage in the high-voltage network, for example, 400 V, to the low voltage in the low-voltage network, for example, 12 V. The DC-DC converters are developed for specific rated powers for this purpose, which usually correspond to the maximum possible powers, and which can be in the range of 1.5-3 kW. High efficiencies can be achieved here, for example, of up to 97%, which only applies at a high degree of utilization, i.e., with higher powers. In a large proportion of the operating time of such electrically operated motor vehicles, however, a power requirement which is significantly lower than the mentioned rated powers exists in the low-voltage network. For example, in battery-assisted electrically operated motor vehicles, there are, for example, approximately 30,000 hours of charging time in addition to the actual driving operation, and in the case of a bidirectional charging operation, such a time span once again. During these long times, for example, 60,000 hours, however, only very low powers are required in the low-voltage network, for example, 100 W.

It has been shown that the efficiency of the DC-DC converter is very poor because of the system in this range of power requirements, for example, is 70%. High energy losses result in this way, in the above-mentioned example in the case of 60,000 hours and 100 W, approximately 2 MWh. With the increasing number of electric motor vehicles worldwide, these are definitely noteworthy energy losses.

US 2018/0019667 A1 relates to a scalable control circuit for faster and simpler regulation of a DC-DC converter. In this case, the DC-DC converter can comprise a plurality of capacitive converter cells, which provide a large number of conversion ratios. In this way, different output voltages can be achieved by selective configuration of a plurality of converter cells.

SUMMARY

The disclosure is based on the object of specifying a possibility for more energy-efficient operation of DC-DC converters in electric motor vehicles.

To achieve this object, it is provided according to the disclosure in a motor vehicle of the type mentioned at the outset that the DC-DC converter comprises at least two independently usable converter circuits having different maximum power and a control unit, wherein the control unit is designed to select at least one converter circuit to be operated in dependence on a power requirement value of the low-voltage network.

According to the disclosure, it is therefore proposed that a plurality, therefore at least two, converter circuits of different capacity, in particular different maximum power, which are usable independently, be provided within a DC-DC converter of an electric motor vehicle, wherein the different converter circuits can also be referred to as power stages or power parts. In the simplest case, a converter circuit having a lower maximum power, i.e., a "smaller power part" is thus additionally integrated into an existing DC-DC converter and can in particular also use the existing infrastructure of the DC-DC converter. This now enables the converter circuit or the combination of converter circuits, which enables an improved or in particular the best efficiency of the DC-DC converter, to be used depending on the power requirement in the low-voltage network, represented by a power requirement value. In this case, the power requirement value is preferably predetermined with the aid of an operating state of the motor vehicle, wherein a power requirement value is associated with each of the possible operating states, which specifies how much power requirement, in particular the maximum, exists in the low-voltage network in this operating state, so that the corresponding power can be provided by the DC-DC converter. However, all converter circuits convert the high voltage of the high-voltage network into the low voltage of the low-voltage network.

The control unit selects at least one of the at least two converter circuits as to be operated, so that the most optimum possible efficiency of the DC-DC converter results. Since the efficiency of converter circuits is typically highest in the power range adjacent to its maximum power, one expedient design of the present disclosure provides that the control unit for selecting at least one converter circuit to be operated is designed in such a way that the overall resulting maximum power of the at least one selected converter circuit is as close as possible above the power requirement value. If more than one converter circuit is selected as to be operated, the individual maximum powers thereof are accordingly to be added together to form the overall resulting maximum power.

In general, it can be stated in the scope of the present disclosure that the control unit can be designed for the exclusive and/or cascading operation of the converter circuits. Designs are also conceivable here in which the control unit is designed to permit solely an exclusive operation of a single one of the converter circuits, while it is also conceivable to only provide cascading operation, so that finally converter circuits can be switched in depending on the power requirement in the low-voltage network. Preferably, in particular in the case of finely resolved provided power requirement values, however, the control unit is designed to enable both the operation of individual converter circuits and also the operation of multiple converter circuits, in order to permit a corresponding efficiency optimization.

In the case of cascading operation, the total of the maximum powers of all converter circuits can particularly advantageously correspond to the rated power. In the case of solely exclusive operation, it should be provided that the most powerful of the converter circuits has a maximum power which corresponds to the rated power.

In specific exemplary embodiments, for example, in the case of solely exclusive usage of individual converter circuits, it can be provided that in the case of two converter circuits, i.e., two power parts, a switch is made between the two power parts depending on the power requirement. If, for example, a charging operating state and a driving operating state are provided as operating states in the case of a rated power of 3 kW for the DC-DC converter, one of these converter circuits can be designed for 3 kW and the other for 100 W. The 100 W converter circuit is then used in the charging operating state and the 3 kW converter circuit is used in the driving operating state.

However, it has proven to be particularly advantageous to use at least one further operating state and thus at least one further converter circuit. This is because it has been shown that the typical vehicle electrical system load of the DC-DC converter in normal driving operation is significantly higher than the 100 W in the charging operation described by way of example, but can nonetheless also be significantly lower than the rated power of the DC-DC converter, for example, less than one-third of the rated power. If, for example, a 3 kW converter circuit were loaded with only 800 W, poor efficiencies could also exist here, for example, 80 to 85%. In this case, for example, three converter circuits can be used, namely a converter circuit designed for 3 kW maximum power, a converter circuit designed for 800 W maximum power, and a converter circuit designed for 100 W, which is then selected by the control unit depending on the existing one of the two driving operating modes or the charging operating mode.

In the context of the present disclosure, however, it is preferable to attempt a cascading or generally combined interconnection by the control unit, since this has the advantage that the converter circuits of higher maximum power can be designed for a lower maximum power, which reduces the complexity, the costs, and the effort. In the above-mentioned example of the rated power of 3 kW and the use of two driving operating modes and one charging operating mode, for example, a first converter circuit having 100 W maximum power, a second converter circuit having 700 W maximum power, and a third converter circuit having 2.2 kW maximum power can be used. Only the smallest stage, i.e., the converter circuit having 100 W maximum power, can then be used in the charging operating state. For the normal driving operation (first driving operating mode), the first power stage (100 W) and the second power stage (which can then be designed by 100 W less having 700 W) can be used, so that 800 W maximum power are provided by these two converter circuits. All three converter circuits are then used for the maximum power operation in the second driving operating mode, wherein the third converter circuit can now be designed by 100 W plus 700 W less, i.e., 2.2 kW, in order to provide the 3 kW maximum power.

Particularly advantageously, in the case of such DC-DC converters comprising more than two converter circuits, of course, further efficiency-optimized combinations can also be used, for example, in the case of a power requirement of 2.3 kW in the low-voltage network, in the above-mentioned example the first and the third power stage can be used jointly, while the second converter circuit (700 W) is not active.

In summary, a DC-DC converter having more than one power stage is thus provided by the present disclosure, wherein a selective operation and/or a cascading operation, in particular also an arbitrarily combining operation are possible, so that the efficiencies of the operating points are improved. If converter circuits corresponding to power stages are used in combination, the individual converter circuits can also be designed to be reduced in the maximum power thereof, so that complexity and costs are reduced.

As already indicated, one advantageous design of the present disclosure provides that the converter circuits are interconnected inside a housing for shared usage of further components, in particular the control unit and/or at least one sensor, of the DC-DC converter. This thus means that the already existing infrastructure of DC-DC converters is used as extensively as possible by all converter circuits jointly, which reduces the complexity, the effort, and the costs, since finally only at least one converter circuit has to be added in contrast to known DC-DC converters.

One advantageous refinement of the present disclosure provides that the DC-DC converter comprises a cooling unit for cooling at least one converter circuit, wherein at least the converter circuit having the lowest maximum power is not connected to the cooling unit. This means that at least a part of the converter circuits of the DC-DC converter can have such a low maximum power that cooling, in particular liquid cooling, is not necessary. This means that due to the low power and thus conversion designed optimally for it, at least one of the converter circuits does not have to be connected to a liquid cooler in the converter.

In addition to the motor vehicle, the disclosure also relates to a method for operating a DC-DC converter in a motor vehicle according to the disclosure, wherein at least one converter circuit to be operated is selected in dependence on a power requirement value of the low-voltage network. All statements with respect to the motor vehicle according to the disclosure may be transferred similarly to the method according to the disclosure and vice versa.

It can thus specifically be provided in the method according to the disclosure that the power requirement value is provided with the aid of an operating state of the motor vehicle, with which the power requirement value is associated. The operating state can be ascertained and provided here, for example, by an energy management control device or the like. A charging operating state, in which the high-voltage battery is charged outside the driving operation, and/or at least one driving operating state, in particular multiple driving operating states, can be used as operating states. Of course, the charging operating state can moreover also be used for the non-charging operation, for example, if only little power is required for other vehicle systems which are in standby operation or are active in another manner when the motor vehicle is not operated for driving and a charging procedure is not present.

It is therefore also provided in the method according to the disclosure that the at least one converter circuit to be operated is selected to optimize the efficiency of the DC-DC converter, to thus be able to at least partially avoid energy losses due to excessively low efficiencies.

BRIEF DESCRIPTION OF THE FIGURES

Further advantages and details of the present disclosure result from the exemplary embodiments described hereafter and with the aid of the drawing. In the figures:

FIG. 3 shows a flow chart to explain the method according to the disclosure

DETAILED DESCRIPTION

Figure 1:
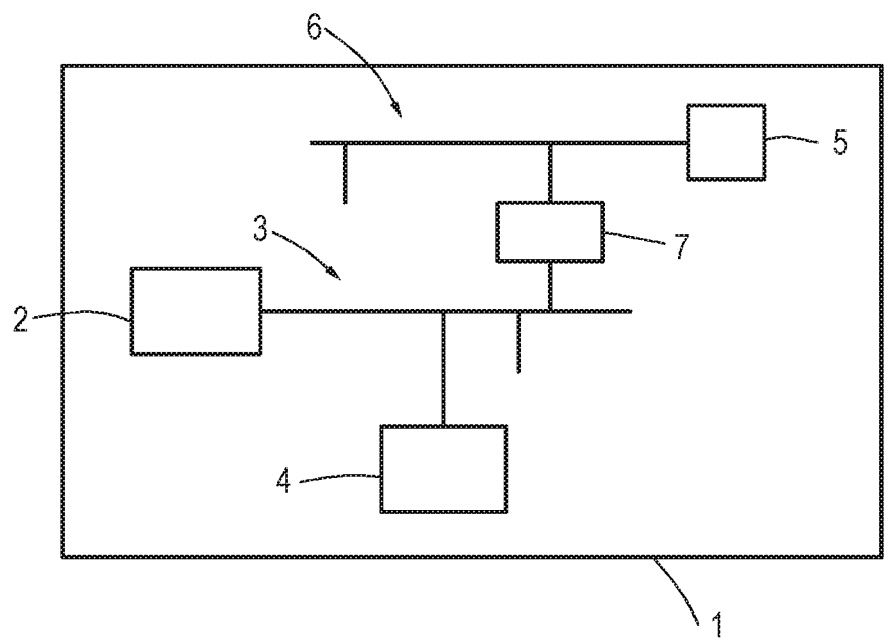
FIG. 1 shows a schematic diagram of a motor vehicle according to the disclosure
Figure 2:
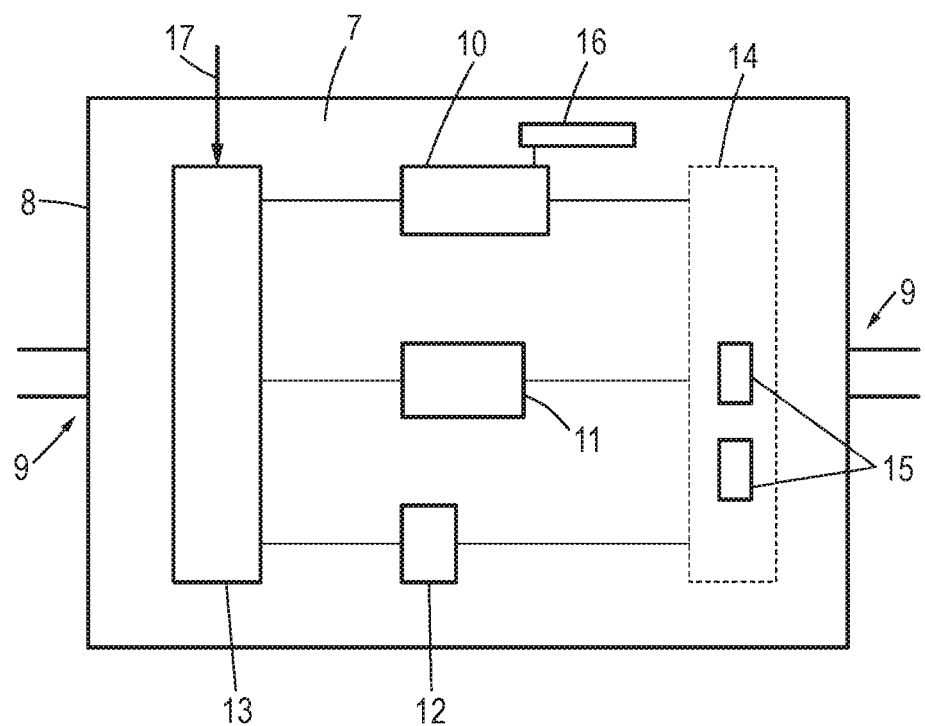
FIG. 2 shows the schematic structure of a DC-DC converter of the motor vehicle according to FIG. 1.

FIG. 1 shows a schematic diagram of a motor vehicle 1 according to the disclosure, in the present case a battery-assisted electrically operated motor vehicle (electric motor vehicle). The motor vehicle 1 accordingly comprises an electric machine 2 as a drive machine, which is connected to a high-voltage network 3 of the motor vehicle 1. A high-voltage battery 4 and also possibly further consumers are also located therein. Low-voltage consumers 5, for example a charge management control device, are connected to a low-voltage network 6 of the motor vehicle 1. In the present exemplary embodiment, the voltage is 400 V in the high-voltage network and is 12 V in the low-voltage network. The low-voltage network 6 can be supplied from the high-voltage network 3 after the low-voltage network 6 and the high-voltage network 3 are connected to one another via a DC-DC converter 7, which steps down the high voltage, 400 V here, to the low voltage, 12 V here. The DC-DC converter 7 has, for example, 3 kW here as the maximum rated power. The schematic structure of the DC-DC converter 7 is apparent from FIG. 2.

Accordingly, the DC-DC converter 7 has three independently operable converter circuits 10, 11, 12 within a housing 8 having corresponding terminals 9, which circuits have different maximum powers and are actuated by a shared control unit 13 and also use a shared sensor arrangement 14 having at least one sensor 15. This means that the infrastructure of the DC-DC converter 7 is used similarly by all converter circuits 10, 11, 12.

In the present case, as indicated by the different sizes of the illustration, the converter circuit 12 is designed for a maximum power of 100 W, the converter circuit 11 is designed for maximum power of 700 W, and the converter circuit 10 is designed for a maximum power of 2.2 kW, so that in total 3 kW result. Since only the converter circuit 10 is designed large enough to be cooled, a corresponding liquid cooling unit 16 of the DC-DC converter 7 is only connected to the converter circuit 10 and actively cools it. All converter circuits convert the high voltage into the low voltage, only with different capacities.

The control unit 13 selects the converter circuits 10, 11, 12 to be operated in dependence on a power requirement value for the low-voltage network 6, which is provided to it in the present case in the form of an operating state as a signal 17, wherein a power requirement value is associated with each operating state, which describes a typical maximum expected power requirement in the low-voltage network 6 in this operating state. The selection of the converter circuits 10, 11, 12 to be operated in a specific operating state is made here by the control unit 13 so that the total resulting maximum power of the converter circuits 10, 11, 12 to be operated is as close as possible above the power requirement value, in particular corresponds thereto, so that overall an outstanding efficiency also results with low power requirement in the low-voltage network 6.

This will be explained in greater detail with the aid of FIG. 3 in an exemplary embodiment of the method according to the disclosure, in which three operating states are used. The three operating states in this case comprise a charging operating state, which generally stands for a non-existent driving operation of the motor vehicle 1 and with which a power requirement value of 100 W is associated, a first driving operating state, which characterizes a normal driving operation and with which a power requirement value of 800 W is associated, and a second driving operating state, in which the maximum power is supposed to be provided in the low-voltage network 6 and with which a power requirement value of 3 kW is therefore associated.

In a step S1, the signal 17 indicating the operating state is received by the control unit 13. In a step S2, the control unit then decides with the aid of the operating state and the associated power requirement value which converter circuits 10, 11, 12 are to be operated. In the case of the charging operating mode, only the converter circuit 12 is operated in a step S3. In the case of the first driving operating mode, the converter circuits 11 and 12 are operated in a step S4. In the case of the second driving operating mode, all three converter circuits 10, 11, 12 are operated in a step S5.

In this exemplary embodiment, the individual converter circuits 10, 11, 12 are thus switched on in a cascading manner in succession. Of course, other exemplary embodiments are also conceivable in which, for example, an exclusive operation of only one converter circuit is always permitted or, in particular with a greater number of conceivable operating states, a usage of further combinations of converter circuits 10, 11, 12 is permitted to achieve an efficiency optimization.

The invention claimed is:

1. A motor vehicle, comprising:
an electric machine as a drive machine,
a high-voltage battery,
a high-voltage network to which the electric machine and the high-voltage battery are connected,
a low-voltage network having a lower voltage than the high-voltage network, and
a DC-DC converter, which connects the low-voltage network and the high-voltage network and is designed for a maximum deliverable rated power,
wherein the DC-DC converter includes at least three independently usable converter circuits having different maximum power and a control unit,
wherein the control unit selects at least one converter circuit to be operated, in dependence on a power requirement value of the low-voltage network,
wherein a first of the at least three converter circuits is rated for a power requirement of a charging operating mode of the motor vehicle,
wherein a second of the at least three converter circuits is rated for a power requirement of a first driving mode of the motor vehicle,
wherein a third of the at least three converter circuits is rated for a power requirement of a second driving mode of the motor vehicle,
wherein the at least three converter circuits are, together with the control unit and/or at least one sensor, contained within a shared housing of the DC-DC converter,
wherein the DC-DC converter further comprises a cooling unit for cooling at least one of the at least three converter circuits, and
wherein at least the first of the at least three converter circuits is disconnected from the cooling unit.

2. The motor vehicle as claimed in claim 1, wherein the control unit for selecting at least one converter circuit to be operated is designed such that the overall resulting maximum power of the at least one selected converter circuit is as close as possible above the power requirement value.

3. The motor vehicle as claimed in claim 1, wherein the control unit is designed to utilize only one of the at least three converter circuits at a time.

4. The motor vehicle as claimed in claim 1, wherein the control unit is designed to utilize the at least three converter circuits in a cascading operation,
wherein, in the case of cascading operation, a sum total of maximum rated power of all of the at least three converter circuits corresponds to the rated power of the DC-DC converter.

5. The motor vehicle as claimed in claim 2, wherein the control unit is designed to utilize only one of the at least three converter circuits at a time.

6. A method for operating the DC-DC converter in a motor vehicle as claimed in claim 1, comprising:
   selection of at least one of the at least three converter circuits to be operated based on the power requirement value of the low-voltage network.

7. The method as claimed in claim 6, wherein the power requirement value is provided on the basis of an operating state of the motor vehicle with which the power requirement value is associated.

8. The method as claimed in claim 6, wherein selection further considers optimization of an efficiency of the DC-DC converter.

9. The method as claimed in claim 7, wherein selection further considers optimization of an efficiency of the DC-DC converter.

\* \* \* \* \*